(12) United States Patent
Leger, Sr.

(10) Patent No.: US 10,123,527 B1
(45) Date of Patent: Nov. 13, 2018

(54) WINCH POLE FOR USE ON AN ATV

(71) Applicant: Freeman Leger, Sr., Iowa, LA (US)

(72) Inventor: Freeman Leger, Sr., Iowa, LA (US)

( * ) Notice: Subject to any disclaimer, the term of this patent is extended or adjusted under 35 U.S.C. 154(b) by 131 days.

(21) Appl. No.: 15/396,737

(22) Filed: Jan. 2, 2017

(51) Int. Cl.
| | |
|---|---|
| *B66C 23/44* | (2006.01) |
| *B66D 3/20* | (2006.01) |
| *B60P 1/54* | (2006.01) |
| *A01M 31/00* | (2006.01) |
| *B66D 3/26* | (2006.01) |

(52) U.S. Cl.
CPC ......... *A01M 31/006* (2013.01); *B60P 1/5471* (2013.01); *B66C 23/44* (2013.01); *B66D 3/20* (2013.01); *B66D 3/26* (2013.01); *B66D 2700/025* (2013.01)

(58) Field of Classification Search
CPC ......... A01M 31/006; B66D 3/20; B66D 3/26; B66D 2700/025; B66C 23/44; B60P 1/5471
See application file for complete search history.

(56) References Cited

U.S. PATENT DOCUMENTS

| | | | | | |
|---|---|---|---|---|---|
| 3,159,368 | A | * | 12/1964 | Ahlbin | B66D 3/02 224/520 |
| 4,806,063 | A | * | 2/1989 | York | A22B 5/06 212/180 |
| 5,752,799 | A | * | 5/1998 | Carey | B60P 1/5471 224/403 |
| 6,138,991 | A | * | 10/2000 | Myers, Jr. | B66C 23/44 212/180 |
| 6,250,483 | B1 | * | 6/2001 | Frommer | A22B 5/06 212/180 |
| 6,616,397 | B1 | * | 9/2003 | Lester | B60P 1/5471 212/177 |
| 6,821,075 | B2 | * | 11/2004 | van der Horn | B60P 1/5452 212/180 |
| 6,981,834 | B1 | * | 1/2006 | Henry | B60P 1/5471 212/299 |
| 7,156,246 | B2 | * | 1/2007 | Sherrod | B66C 23/44 212/180 |
| 7,201,552 | B1 | * | 4/2007 | Angel | A22B 5/06 212/180 |
| 7,845,622 | B1 | * | 12/2010 | Riggs | B66C 23/44 212/180 |
| 2006/0280584 | A1 | * | 12/2006 | Spuzak | B66C 23/44 414/462 |
| 2007/0092362 | A1 | * | 4/2007 | Holt | B60P 1/5471 414/462 |
| 2007/0108731 | A1 | * | 5/2007 | McBroom | B60D 1/36 280/477 |
| 2010/0111658 | A1 | * | 5/2010 | Galliano | A01M 31/006 414/462 |
| 2010/0200822 | A1 | * | 8/2010 | Kitchens, Sr. | B66C 23/44 254/326 |
| 2011/0248228 | A1 | * | 10/2011 | Gause | B66D 3/006 254/323 |
| 2015/0225212 | A1 | * | 8/2015 | Avila | B66C 23/44 414/800 |

* cited by examiner

*Primary Examiner* — Michael E Gallion
(74) *Attorney, Agent, or Firm* — Paul R. Martin (57) ABSTRACT

A winch pole unit that is attached to an ATV four wheeler rack and swivels on a 2 inch receiver ball. It is designed to pick up and load deer on the rear rake, can be loaded by one person.

10 Claims, 10 Drawing Sheets

WINCH POLE FOR USE ON AN ATV

TECHNICAL FIELD OF THE INVENTION

The present invention relates to the general art of land vehicles, and to the particular field of accessories for use with land vehicles, such as ATVs.

BACKGROUND OF THE INVENTION

ATVs or all terrain vehicles are very useful in getting to remote and rough terrain locations that are frequently hunted and cannot be accessed by a pick-up truck. The ATVs are particularly important because they can be equipped with a lift or hoist that can be used to skin and dress captured game right on sight or to carry and lift cargo or heavy equipment. These lifts and hoists are particularly useful when hanging and dressing game, since the hunter using the ATV does not have to drag the captured game on the ground, which expends a lot of energy and prevents contamination or damage of the captured game.

It is known to equip ATVs and pick-up trucks with lifting devices that can hoist a captured game upwards and allow a hunter to hoist the captured game and skin and dress it right at the point of kill. By skinning and dressing the captured game early after the captured game has been killed, the hunter can better prepare the meat from the captured game. These lifting devices can be collapsible for easy storage and will often include a winch and a gambrel. Other features include supporting brackets to the ground or fender of a vehicle and a spindle to turn or spin the captured game into different positions in relation to the transporting vehicle.

There are also such lifting devices designed specifically for ATVs. The ATVs and lifting devices are many times preferred by hunters over pick-up trucks because of their mobility and are known to have accessory features such as a spindle to rotate any hanging captured game, a winch and gambrel and a lifting device that has a telescoping boom. Although the lifting devices for ATVs are novel and useful, they could be improved.

Therefore, it is an object of the present invention to improve the devices used to hoist an animal onto an ATV.

More specifically, it is often difficult, cumbersome, or even impossible to lift a heavy carcass, then jockey it onto a vehicle. These problems are exacerbated if the vehicle has limited cargo space, such as is the case with an ATV, or if the vehicle must be parked in a location that makes it difficult to move the carcass from the ground to the vehicle. All of these problems are especially aggravated if the hunter is not strong enough to deftly handle the carcass. This might be the situation if the hunter is disabled, or weakened for any reason.

Therefore, it is an object of the present invention to provide a unit that can be used in conjunction with an ATV to efficiently lift and move an animal from the ground onto the vehicle.

SUMMARY OF THE INVENTION

The above-discussed disadvantages of the prior art are overcome by a winch pole unit that is attached to an ATV four wheeler rack and swivels on a 2 inch receiver ball. It is designed to pick up and load deer on the rear rake, and can be loaded by one person.

More specifically, the unit embodying the present invention is attached to an ATV 4-wheeler rack and swivels on a 2" receiver ball. The unit is designed to pick up and load a deer, hog, etc. onto the rear rake of an ATV. The preferred form of the unit is rated from 250 to 300 pounds. The winch mount is attached using two ⅜" bolts. There's a ½" rod on each side. The rod is used to rotate the unit to load the animal onto the vehicle after picking it up. The pole can be rotated on a receiving hitch. The receiving hitch has a welded plate that is attached to the axle of the ATV. The preferred form of the support pole of the unit has an inside diameter of 2" so that it's able to be received by the 2" ball. The support pole sits and rotates on the ball. The preferred form of the unit has a galvanized coating while the other parts are steel and are powder coated.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Referring to the figures, it can be understood that the present invention is embodied in a unit 10 for use with an ATV for carrying game animals. The unit works in conjunction with a winch W having a rope R that will be connected to the animal carcass to be carried. Unit 10 comprises a hitch assembly 20 which is mounted on an ATV for carrying game animals. The hitch assembly includes a support plate 22 having a proximal end 24, a distal end 26, a first portion 28 which extends from the proximal end toward the distal end, a second portion 30 which extends from the first portion to the distal end, and offset portion 32 connecting the second portion of the support plate to the first portion of the support plate and spacing the second portion of the support plate apart from the first portion of the support plate. The proximal end of the support plate is securely affixed to the ATV, and is oriented to extend horizontally away from the ATV. The support plate has a first surface 40 which is a top surface when the support plate is mounted on the ATV and a second surface 42 which is a bottom surface when the support plate is mounted on the ATV.

An eye bolt 50 is located on the second portion of the support plate closely adjacent to the distal end of the support plate.

Figure 1:
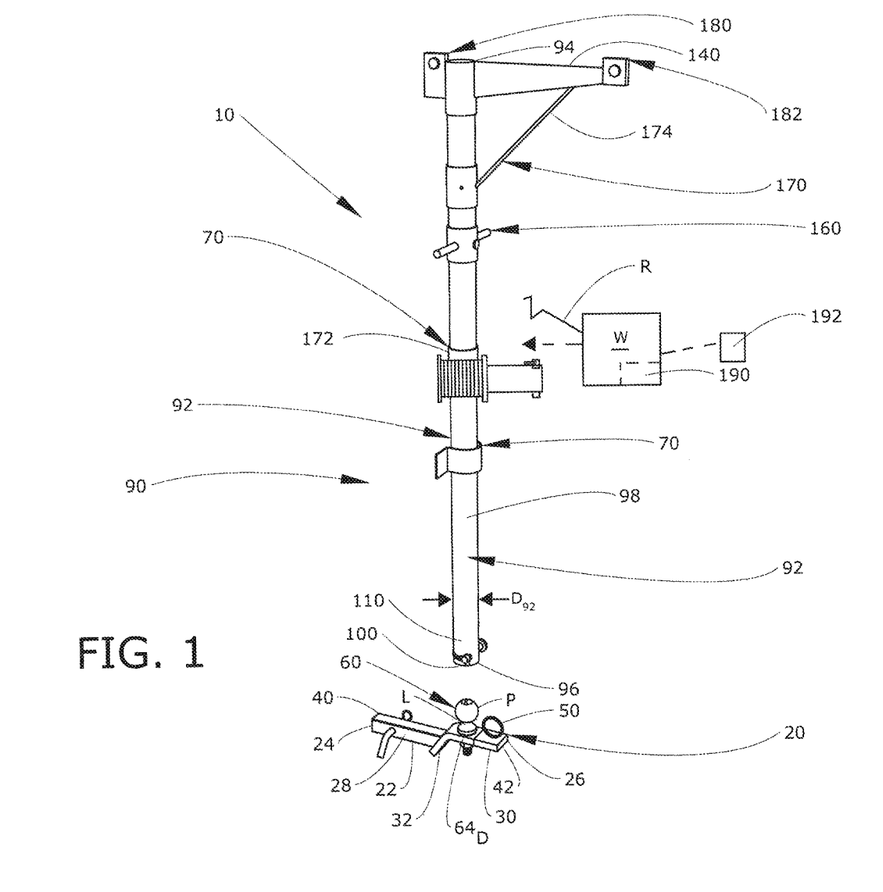
FIG. 1 shows the unit embodying the teaching of the present invention.
Figure 2:
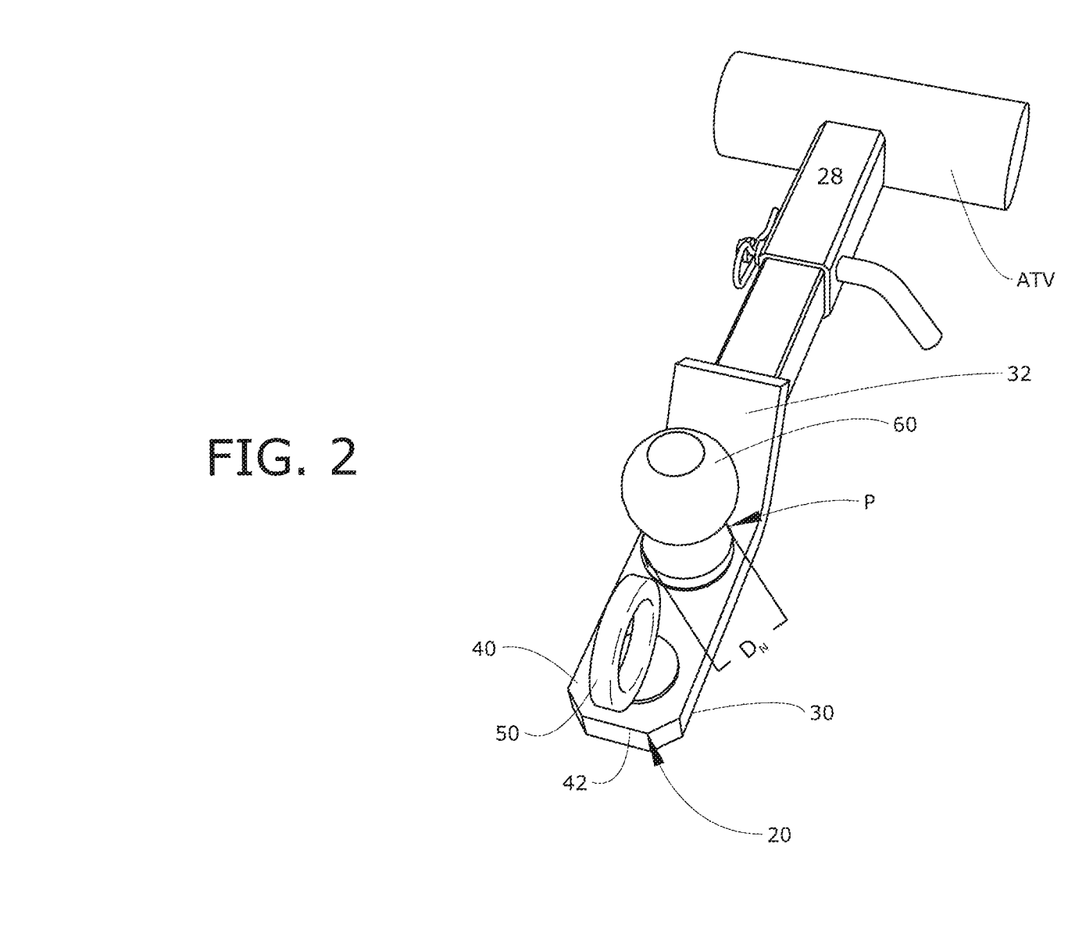
FIG. 2 shows a support plate unit included in the unit of the present invention.
Figure 4:
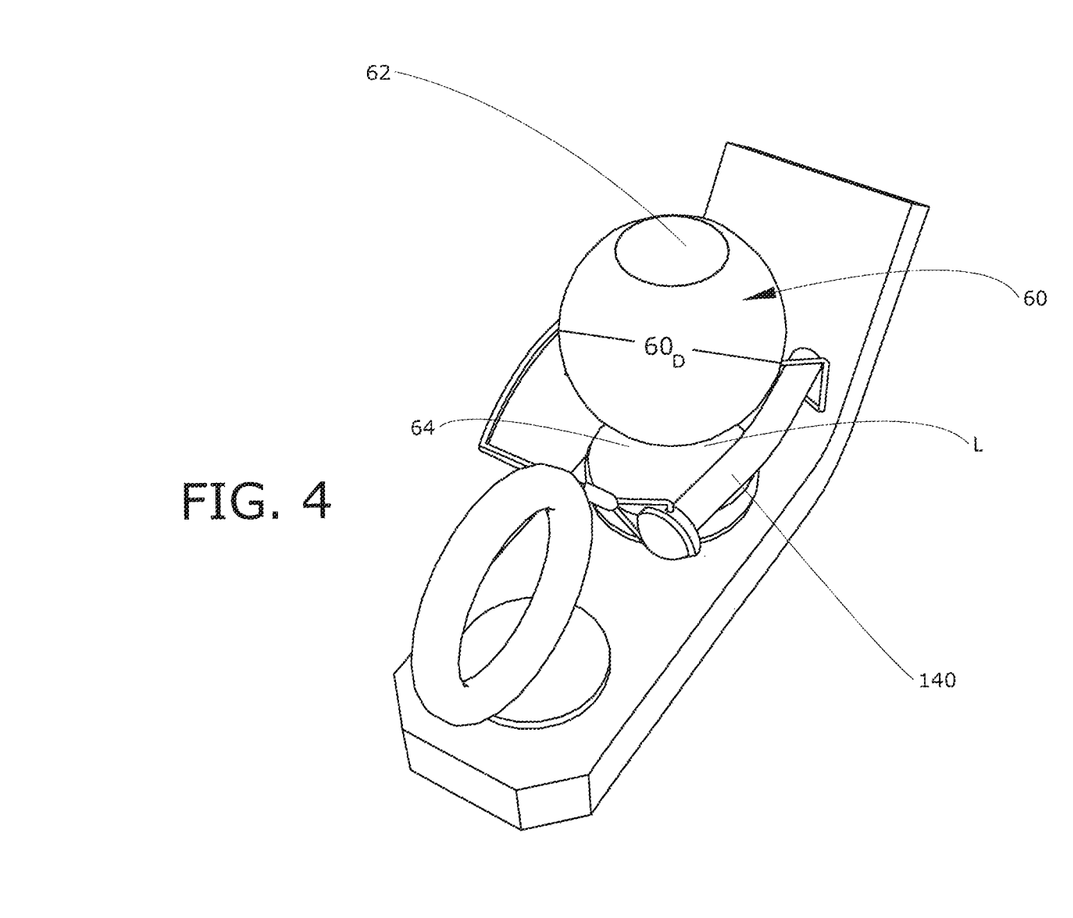
FIG. 4 shows a detail of the hitch ball unit of the unit embodying the present invention.

Referring to FIGS. 1, 2 and 4, it can be seen that unit 10 further comprises a hitch ball unit 60 on the second portion of the support plate adjacent to the distal end of the support plate. Hitch ball unit 60 includes a spherical element 62 that is located spaced apart from first surface 40 of the support plate A neck 64 connects the spherical element to the first surface of the support plate. Spherical element 60 has a diameter $D_{60}$ and a neck 64 which has a diameter $64_D$ which is smaller than diameter $D_{60}$ of the spherical element whereby there is a passage P defined between the spherical element and the first surface of the support plate. Neck has a length L measured between the first surface of the support plate and the spherical element whereby the passage has dimension L that is measured between the first surface of the support plate and the spherical element.

Figure 8:
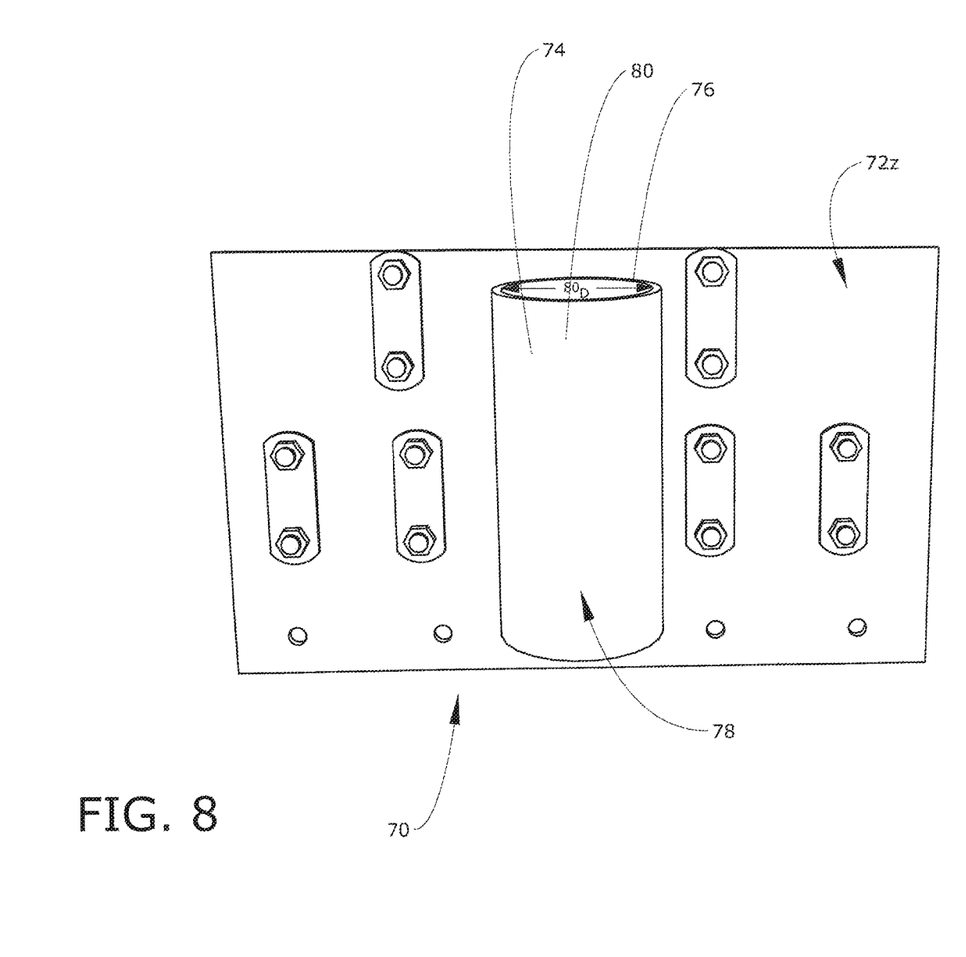
FIG. 8 shows a shows a collar assembly used in the unit of the present invention.

Referring to FIGS. 1 and 8, it can be seen that unit 10 further comprises a collar assembly 70 mounted on the ATV. The collar assembly includes a mounting plate 72 fixedly mounted on the ATV, a hollow cylindrical collar 74 having a first end 76, a second end 78 and a bore 80 extending from the first end of the collar to the second end of the collar, the bore of the hollow cylindrical collar having a diameter $80_D$. The collar is mounted on the ATV to orient bore 80 of the collar upright and located directly above the support plate.

Figure 5:
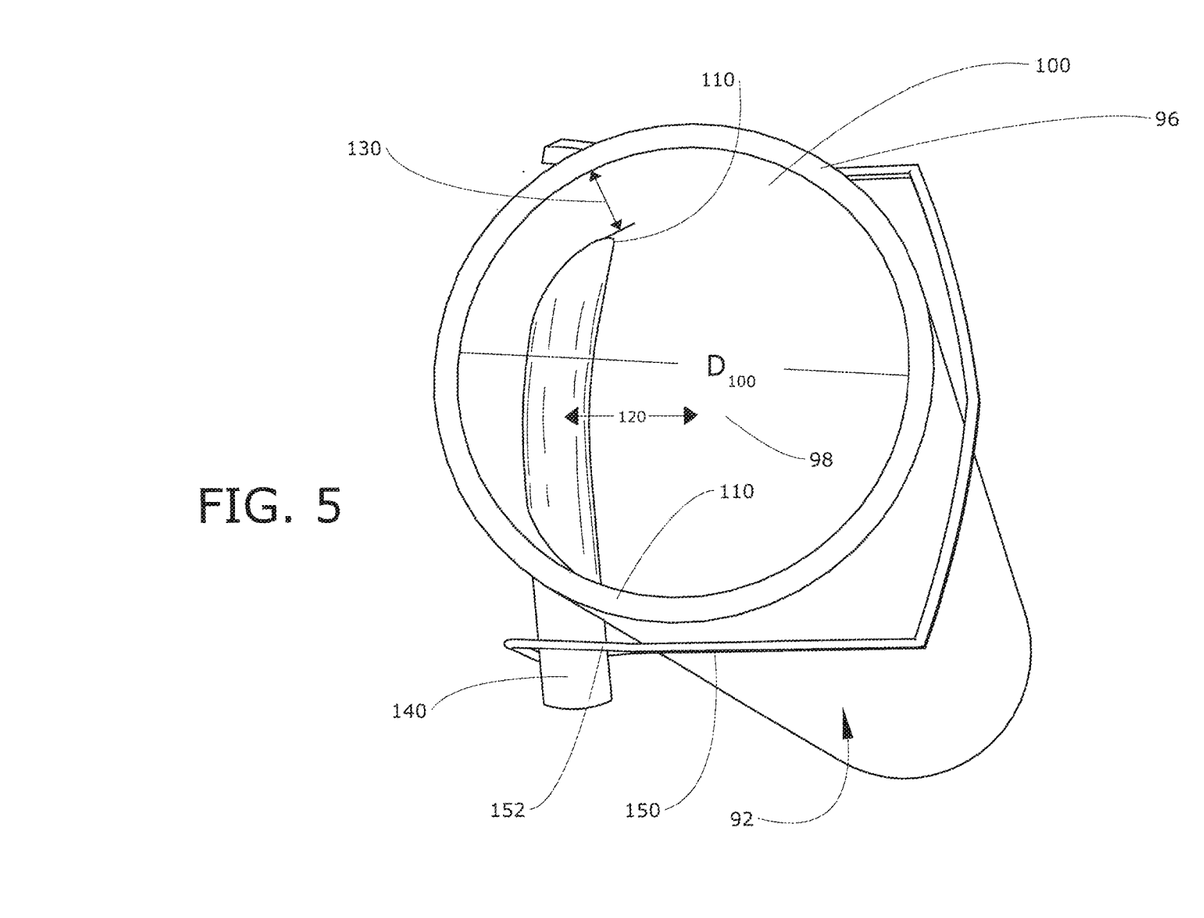
FIG. 5 shows a detail of the support pole cylindrical body of the unit of the present invention.
Figure 6:
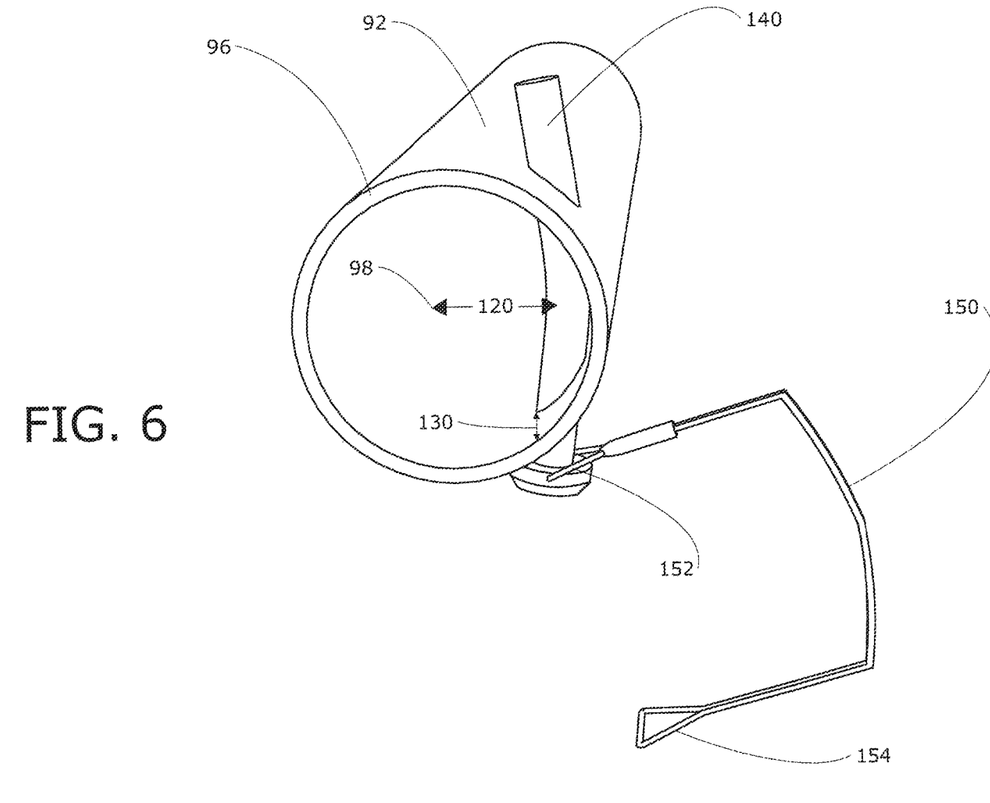
FIG. 6 shows a detail of the support pole cylindrical body with a retainer element.

Referring to FIGS. 1, 5 and 6, it can be seen that unit 10 further comprises a support pole unit 90 which includes a cylindrical body 92 having an outer diameter $92_D$ which is smaller than the diameter $80_D$, of the bore of the cylindrical collar whereby cylindrical body 92 is slidably received in bore 80 of the hollow cylinder of the collar assembly. Cylindrical support pole body 92 has a first end 94, a second end 96, and a longitudinal axis 98 extending between the first end of the support pole cylindrical body and the second end of the support pole cylindrical body. A bore 100 extends from second end 96 of the support pole cylindrical body toward first end 94 of the support pole cylindrical body. Bore 100 in the support pole cylindrical body has an internal diameter $D_{100}$ which is slightly larger than diameter $D_{60\,100}$ of the spherical element on the hitch ball unit whereby the spherical element of the hitch ball unit is slidably accommodated in the support pole cylindrical body bore so the support pole cylindrical body can rotate about the longitudinal axis of the support pole cylindrical body and about the spherical element when the support pole cylindrical body is mounted on the support plate spherical element.

Two locking pin accommodating holes 110 are defined through the cylindrical body adjacent to second end 96 of the support pole cylindrical body. As can be seen in FIGS. 3, 4, 5, 6 and 7, the locking pin accommodating holes are offset from longitudinal axis 98 of the support pole cylindrical body a distance 120 and are spaced from the second end of the support pole cylindrical body a distance 130 which is less than the dimension L (see FIGS. 1 and 4) of the passage defined by the hitch ball unit neck between the first surface of the support plate and the spherical element.

A locking pin 140 is accommodated in the support pole two locking pin accommodating holes 110 and extends through the hitch ball unit passage P adjacent to the hitch ball unit neck 64 and between the hitch ball unit spherical element 60 and first surface 40 of the support plate to rotatably lock the support pole cylindrical body to the support plate whereby the support pole cylindrical body can rotate about the longitudinal axis of the support pole cylindrical axis while remaining attached to the hitch ball unit spherical element.

Outer diameter $92_D$ of the support pole cylindrical body is slightly smaller than diameter $80_D$ of the collar assembly collar so that the support pole cylindrical body is rotatably accommodated in the collar of the collar assembly when the support pole cylindrical body is connected to the hitch unit spherical element and mounted on the first surface of the support plate.

As is best shown in FIGS. 1 and 6, unit 10 further comprises a support arm 140 mounted on first end 94 of the support pole unit cylindrical body to extend radially outward from the longitudinal axis of the support pole unit cylindrical body for supporting game on the ATV via the support pole unit.

Figure 3:
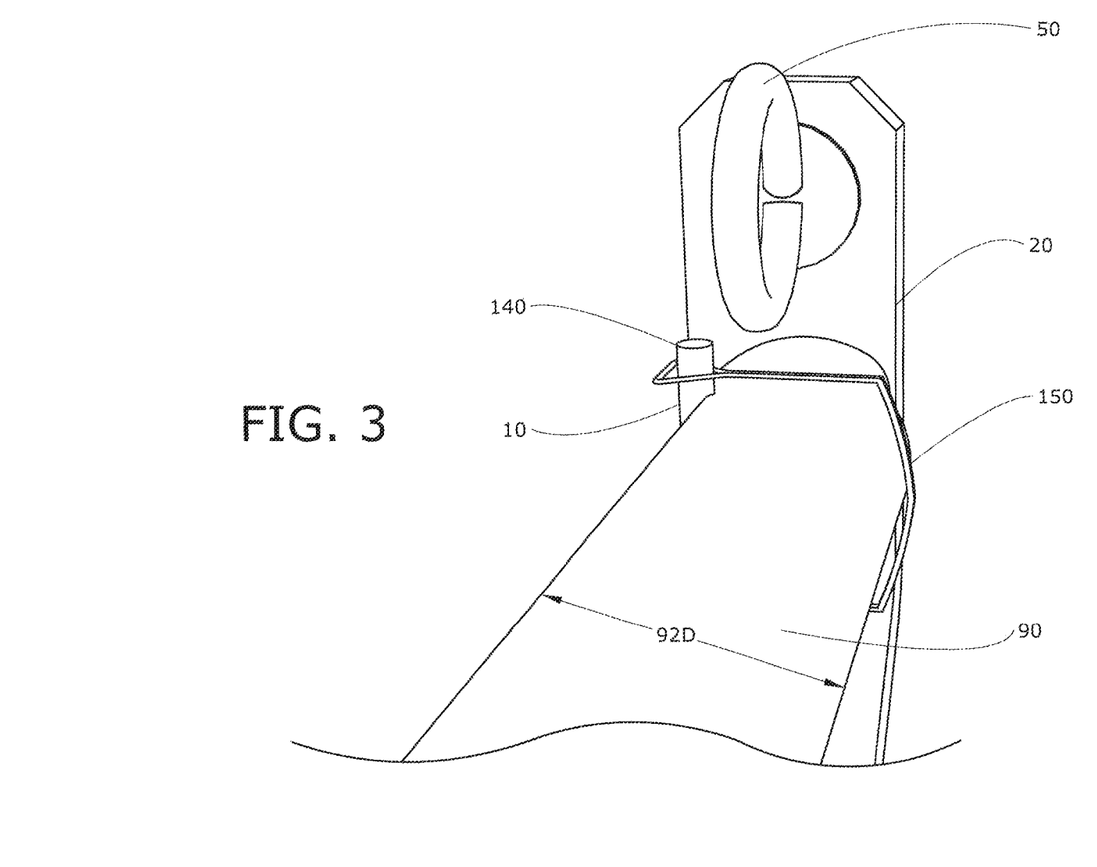
FIG. 3 shows a detail of the support pole cylindrical body mounted on the support plate.
Figure 7:
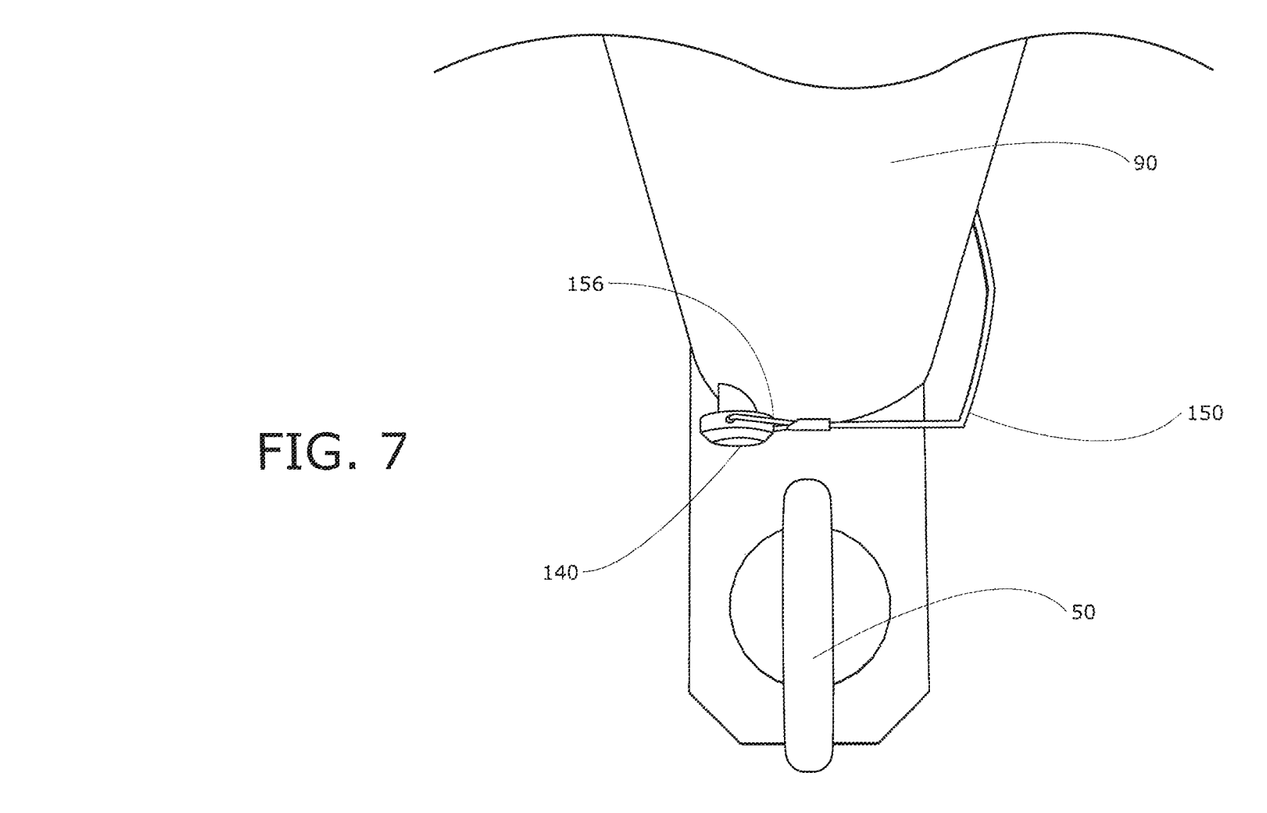
FIG. 7 shows a detail of the support pole cylindrical body with a retainer element.

As can be seen in FIGS. 3, 6 and 7, unit 10 further comprises a retainer element 150 which extends around the support unit cylindrical body and has two ends 152 and 154. Each end 152 and 154 of the retainer element is connected to locking pin and the retainer element on diametrically opposite locations of the body 92 and the body of the retainer element is located circumjacent to the outer surface of the support pole unit cylindrical body 92 to partially surround body 92 for retaining the support element cylindrical body locked in place on the hitch ball unit spherical element.

A handle unit 160 is mounted on the support unit cylindrical body for rotating the support unit cylindrical body about the longitudinal axis of the support unit cylindrical body.

Figure 9:
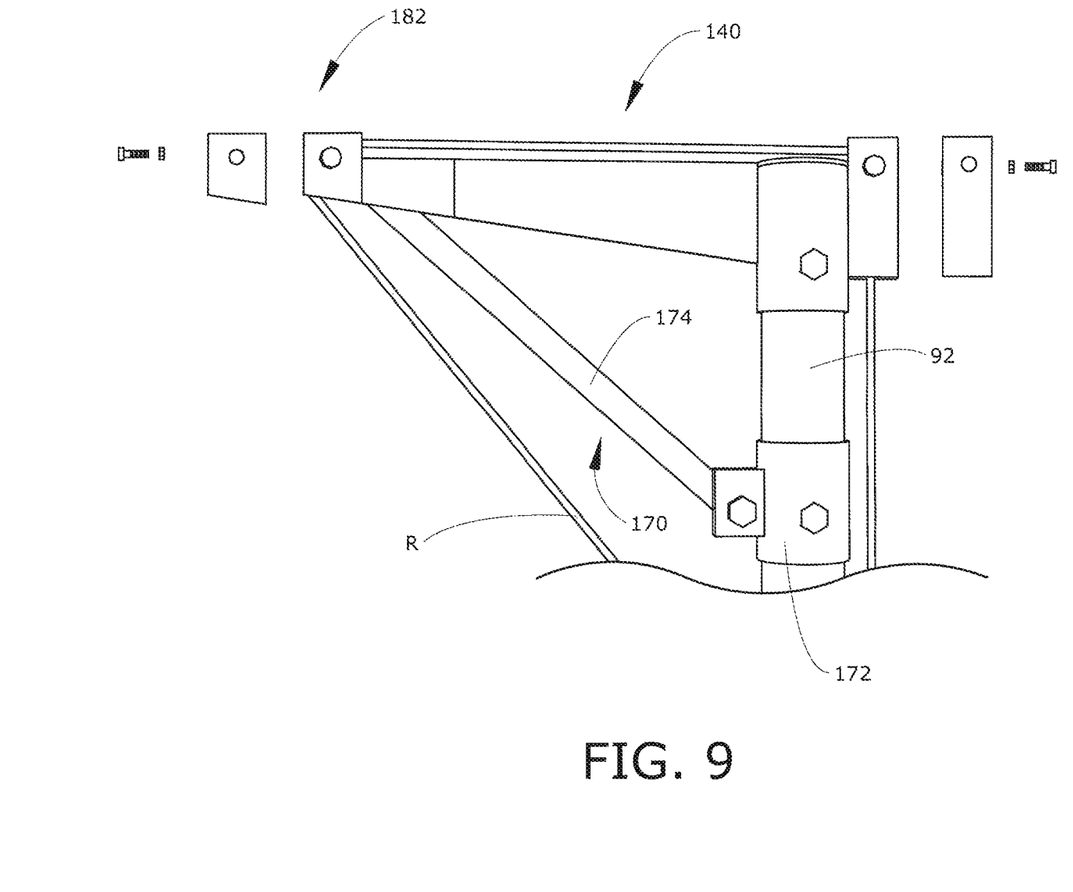
FIG. 9 shows a stabilizer unit used in the unit of the present invention.
Figure 10A:
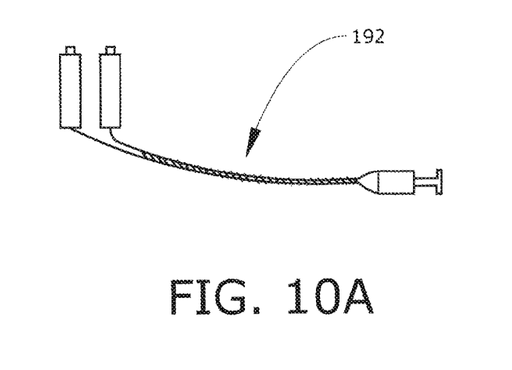
FIG. 10A shows an on/off switch unit used in the unit of the present invention.
Figure 10B:
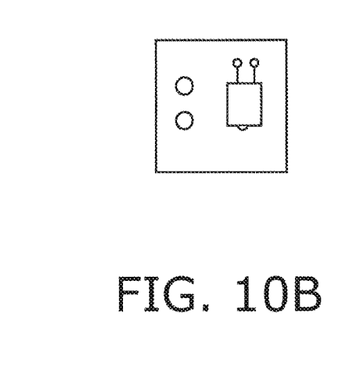
FIG. 10B shows a shows a front view of a mount for making electrical connections between the on/off unit and a power unit.
Figure 10C:
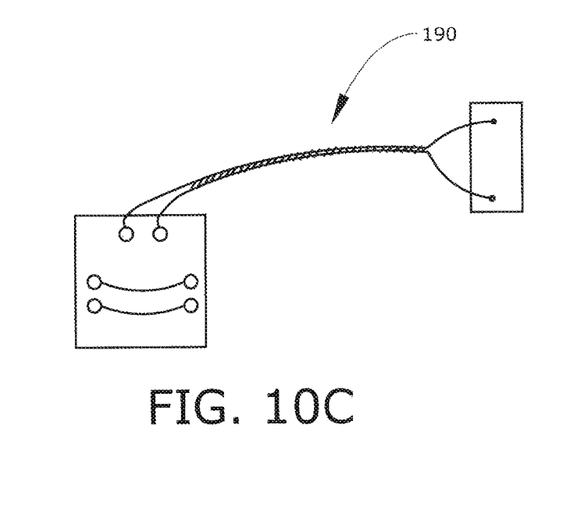
FIG. 10C shows a power unit connected to the mount in the rear of the mount.
Figure 11:
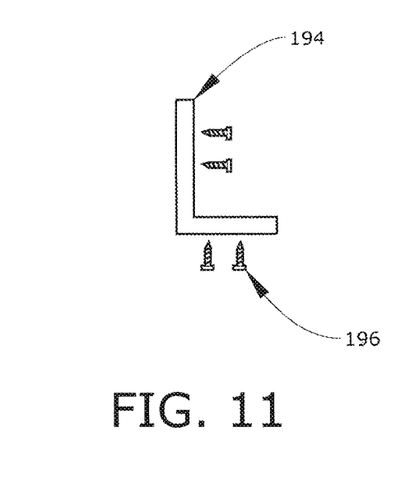
FIG. 11 shows a shows a mount for mounting the power unit on a rear frame of an ATV.

As shown in FIGS. 1 and 9, unit 10 further comprises a stabilizer unit 170 which connects support arm 140 to support unit cylindrical body 190 via a collar 172 and a bar 174.

Two mounting plate elements 180 and 182 on the support arm accommodate game-tying cable R.

As indicated in FIGS. 10A, 10B, 10C, and 11, unit 10 further includes a power pack 190 and an on/off switch 192 connecting the winch unit to the power pack. The power pack is mounted on the rear frame of the ATV by an L-shaped mount 194 using self-taping screws, such as screws 196.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:
1. A unit for use with an ATV for carrying game animals, the unit comprising:
   A. a hitch assembly which is mounted on an ATV for carrying game animals, the hitch assembly including

(1) A support plate having a proximal end, a distal end, a first portion which extends from the proximal end toward the distal end, a second portion which extends from the first portion to the distal end, and offset portion connecting the second portion of the support plate to the first portion of the support plate and spacing the second portion of the support plate apart from the first portion of the support plate, the proximal end of the support plate being securely affixed to the ATV, the support plate being oriented to extend horizontally away from the ATV, the support plate further including a first surface which is a top surface when the support plate is mounted on the ATV, a second surface which is a bottom surface when the support plate is mounted on the ATV, (2) an eye bolt on the second portion of the support plate, the eye bolt being located closely adjacent to the distal end of the support plate, and (3) a hitch ball unit on the second portion of the support plate adjacent to the distal end of the support plate, the hitch ball unit including a spherical element that is located spaced apart from the first surface of the support plate, a neck connecting the spherical element to the first surface of the support plate, the spherical element having a diameter, and the neck having a diameter which is smaller than the diameter of the spherical element whereby there is a passage defined between the spherical element and the first surface of the support plate, the neck having a length measured between the first surface of the support plate and the spherical element whereby the passage has a dimension that is measured between the first surface of the support plate and the spherical element;

B. a collar assembly mounted on the ATV, the collar assembly including
  (1) a mounting plate fixedly mounted on the ATV,
  (2) a hollow cylindrical collar having a first end, a second end and a bore extending from the first end of the collar to the second end of the collar, the bore of the hollow cylindrical collar having a diameter, and
  (3) the collar being mounted on the ATV to orient the bore of the collar upright and located directly above the support plate;

C. a support pole unit which includes
  (1) a cylindrical body having an outer diameter which is smaller than the diameter of the bore of the cylindrical collar whereby the cylindrical body is slidably received in the bore of the hollow cylinder of the collar assembly, the cylindrical support pole body having a first end, a second end, a longitudinal axis extending between the first end of the support pole cylindrical body and the second end of the support pole cylindrical body, a bore which extends from the second end of the support pole cylindrical body toward the first end of the support pole cylindrical body the bore in the support pole cylindrical body having an internal diameter which is slightly larger than the diameter of the spherical element on the hitch ball unit whereby the spherical element of the hitch ball unit is slidably accommodated in the support pole cylindrical body bore so the support pole cylindrical body can rotate about the longitudinal axis of the support pole cylindrical body and about the spherical element when the support pole cylindrical body is mounted on the support plate spherical element, (2) two locking pin accommodating holes defined through the cylindrical body adjacent to the second end of the support pole cylindrical body, the locking pin accommodating holes being offset from the longitudinal axis of the support pole cylindrical body and spaced from the second end of the support pole cylindrical body a distance which is less than the dimension of the passage defined by the hitch ball unit neck between the first surface of the support plate and the spherical element, the locking pin accommodating holes being offset from the support pole cylindrical body longitudinal axis an offset distance, (3) a locking pin accommodated in the support pole two locking pin accommodating holes, the locking pin extending through the hitch ball unit passage adjacent to the hitch ball unit neck and between the hitch ball unit spherical element and the first surface of the support plate to rotatably lock the support pole cylindrical body to the support plate whereby the support pole cylindrical body can rotate about the longitudinal axis of the support pole cylindrical axis while remaining attached to the hitch ball unit spherical element, (4) the outer diameter of the support pole cylindrical body being slightly smaller than the diameter of the collar assembly collar so that the support pole cylindrical body is rotatably accommodated in the collar of the collar assembly when the support pole cylindrical body is connected to the hitch unit spherical element and mounted on the first surface of the support plate; and D. a support arm mounted on the first end of the support pole unit cylindrical body to extend radially outward from the longitudinal axis of the support pole unit cylindrical body for supporting game on the ATV via the support pole unit.

2. The unit defined in claim 1 further comprising a retainer element which extends around the support unit cylindrical body and has two ends, with each end of the retainer element being connected to the locking pin for retaining the support element cylindrical body locked in place on the hitch ball unit spherical element.

3. The unit defined in claim 2 further comprising a winch mount on the support unit cylindrical body.

4. The unit defined in claim 3 further comprising a handle unit on the support unit cylindrical body for rotating the support unit cylindrical body about the longitudinal axis of the support unit cylindrical body.

5. The unit defined in claim 4 further comprising a stabilizer unit connecting the support arm to the support unit cylindrical body.

6. The unit defined in claim 5 further comprising two mounting plate elements on the support arm for accommodating a game-tying cable.

7. The unit defined in claim 6 further comprising a winch unit mounted on the ATV and including a cable threaded through the mounting plate elements and extending along the support unit cylindrical body.

8. The unit defined in claim 7 wherein the winch unit further includes a power pack and an on/off switch connecting the winch unit to the power pack.

9. The unit defined in claim 8 wherein the stabilizer unit includes a collar mounted on the support unit cylindrical pole and a bar having a first end connected to the stabilizer unit collar and a second end connected to the support arm.

10. A unit for use with an ATV for carrying game animals, the unit comprising:
- E. a hitch assembly which is mounted on an ATV for carrying game animals, the hitch assembly including
  - (4) A support plate oriented to extend horizontally away from the ATV, and
  - (5) a hitch ball unit on the support plate, the hitch ball unit including a spherical element that is located spaced apart from the support plate, a neck connecting the spherical element to the support plate, the spherical element having a diameter, and the neck having a diameter which is smaller than the diameter of the spherical element whereby there is a passage defined between the spherical element and the support plate, the neck having a length measured between the support plate and the spherical element whereby the passage has a dimension that is measured between the support plate and the spherical element;
- F. a collar assembly mounted on the ATV, the collar assembly including
  - (4) a mounting plate fixedly mounted on the ATV,
  - (5) a hollow cylindrical collar having a first end, a second end and a bore extending from the first end of the collar to the second end of the collar, and
  - (6) the collar being mounted on the ATV to orient the bore of the collar upright and located directly above the support plate; and
- G. a support pole unit which includes
  - (5) a cylindrical body slidably received in the bore of the hollow cylinder of the collar assembly, the cylindrical support pole body having a first end, a second end, a longitudinal axis extending between the first end of the support pole cylindrical body and the second end of the support pole cylindrical body, a bore which extends from the second end of the support pole cylindrical body toward the first end of the support pole cylindrical body the bore in the support pole cylindrical body having an internal diameter which is slightly larger than the spherical element on the hitch ball unit so that the spherical element of the hitch ball unit is slidably accommodated in the support pole cylindrical body bore so the support pole cylindrical body can rotate about the longitudinal axis of the support pole cylindrical body and about the spherical element when the support pole cylindrical body is mounted on the support plate spherical element,
  - (6) two locking pin accommodating holes defined through the cylindrical body adjacent to the second end of the support pole cylindrical body, the locking pin accommodating holes being offset from the longitudinal axis of the support pole cylindrical body and spaced from the second end of the support pole cylindrical body a distance which is less than the dimension of the passage defined by the hitch ball unit neck between the first surface of the support plate and the spherical element, the locking pin accommodating holes being offset from the support pole cylindrical body longitudinal axis an offset distance, and
  - (7) a locking pin accommodated in the support pole two locking pin accommodating holes, the locking pin extending through the hitch ball unit passage adjacent to the hitch ball unit neck and between the hitch ball unit spherical element and the first surface of the support plate to rotatably lock the support pole cylindrical body to the support plate whereby the support pole cylindrical body can rotate about the longitudinal axis of the support pole cylindrical axis while remaining attached to the hitch ball unit spherical element.

\* \* \* \* \*